United States Patent
Blandy et al.

(10) Patent No.: US 6,481,006 B1
(45) Date of Patent: Nov. 12, 2002

(54) METHOD AND APPARATUS FOR EFFICIENT INVOCATION OF JAVA METHODS FROM NATIVE CODES

(75) Inventors: Geoffrey Owen Blandy; Bentley John Hargrave, both of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/306,193

(22) Filed: May 6, 1999

(51) Int. Cl.$^7$ ............................................. G06F 9/45
(52) U.S. Cl. ......................................................... 717/139
(58) Field of Search ........................... 717/5, 6, 7, 138, 717/139–148, 151–161; 703/23

(56) References Cited

U.S. PATENT DOCUMENTS

| | | | | |
|---|---|---|---|---|
| 6,009,517 A | * | 12/1999 | Bak et al. | 712/245 |
| 6,066,181 A | * | 5/2000 | DeMaster | 717/5 |
| 6,081,665 A | * | 6/2000 | Nilsen et al. | 717/5 |
| 6,167,567 A | * | 12/2000 | Chiles et al. | 717/11 |
| 6,226,789 B1 | * | 5/2001 | Tye et al. | 717/7 |
| 6,269,373 B1 | * | 7/2001 | Apte et al. | 707/10 |

OTHER PUBLICATIONS

Buhler et al. The Java Can API–A Java Gateway to Fieldbus Communication. IEEE. 2000. pp. 37–43.*

* cited by examiner

Primary Examiner—Gregory Morse
Assistant Examiner—Wei Zhen
(74) Attorney, Agent, or Firm—Duke W. Yee; Jeffrey S. LaBaw

(57) ABSTRACT

A method and apparatus in a data processing system for executing a Java method from native code. A method is examined prior to first execution of the method to identify a presence of selected parameters from a set of parameters for the method. A bitmask is created to describe the selected parameters. The set of parameters is copied to a frame using the mask. Further, a new return bytecode is used to handle a return to a native calling method. Method block location is handled using identifying information about the method.

58 Claims, 7 Drawing Sheets

METHOD AND APPARATUS FOR EFFICIENT INVOCATION OF JAVA METHODS FROM NATIVE CODES

BACKGROUND OF THE INVENTION

1. Technical Field

The present invention relates generally to an improved data processing system, and in particular to a method and apparatus for executing instructions in a data processing system. Still more particularly, the present invention relates to a method and apparatus for invoking Java methods from native code.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

When extra speed in executing a Java program is needed, a Just In Time (JIT) compiler may be used to translate bytecodes for a method or class into native machine instructions before executing them. Typically, this compilation only occurs once per method. Some JIT compilers may compile entire classes, rather than one method at a time.

Java methods are commonly invoked from native code and the presently available methods for invoking Java methods from native code are extremely inefficient. For each such invocation, control is passed to the JVM which, after various housekeeping steps, creates a temporary Java method consisting of an invoke of the target method and a return. The requisite constant pool is also created and typically contains 4 entries: a CONSTANT_MethodRef which points to a CONSTANT_NameAndType which in turn points to two CONSTANT_Utf8 strings which identify the target method name and signature. The JVM also creates a javaframe on the javastack, copying parameters for the target Java method from the native stack to the javastack under control of the method signature. The javaframe is then marked to indicate that a return to native code is required when the target Java method completes. Control is then passed to the interpreter to execute the temporary method just created. When the invoke bytecode is interpreted, it goes through the process of "quickification" which involves the costly constant pool resolution of the Methodref operand and the modification of the invoke bytecode. The new "quickified" bytecode is then interpreted which finally causes the original target method to be invoked. When the target Java method completes, by executing one of the standard return bytecodes, the interpreter must inspect the javaframe to determine whether the method is returning to Java code or to native code. Performing all the above steps takes considerable time and slows down the invocation of Java methods when called from native code. Additionally there is a slight performance penalty paid on all Java method invocations in that the interpretation of the return bytecodes must include the step of checking for return to native code.

Therefore, it would be advantageous to have an improved method and apparatus for invoking Java methods from native code.

SUMMARY OF THE INVENTION

The present invention provides a method and apparatus in a data processing system for invoking a Java method from native code. A method is examined prior to first execution of the method to identify the presence of selected parameters from a set of parameters for the method. A bitmask is created to describe the selected parameters. The set of parameters is copied to a frame using the mask. Further, a new return bytecode is used to handle a return to a native calling method. Method block location is handled using identifying information about the method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6C are flowcharts of a process for copying parameters from the native frame to the javaframe depicted in accordance with a preferred embodiment of the present invention;

DETAILED DESCRIPTION OF THE PREFERRED EMBODIMENT

Figure 1:
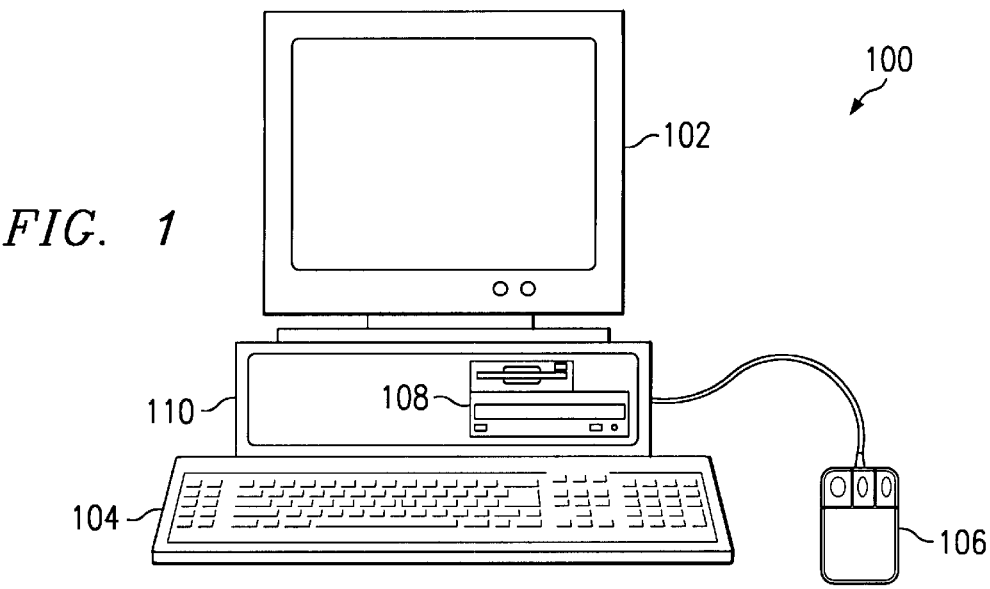
FIG. 1 is a pictorial representation depicting a data processing system in which the present invention may be implemented in accordance with a preferred embodiment of the present invention.

With reference now to the figures and in particular with reference to FIG. 1, a pictorial representation depicting a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

Figure 2:
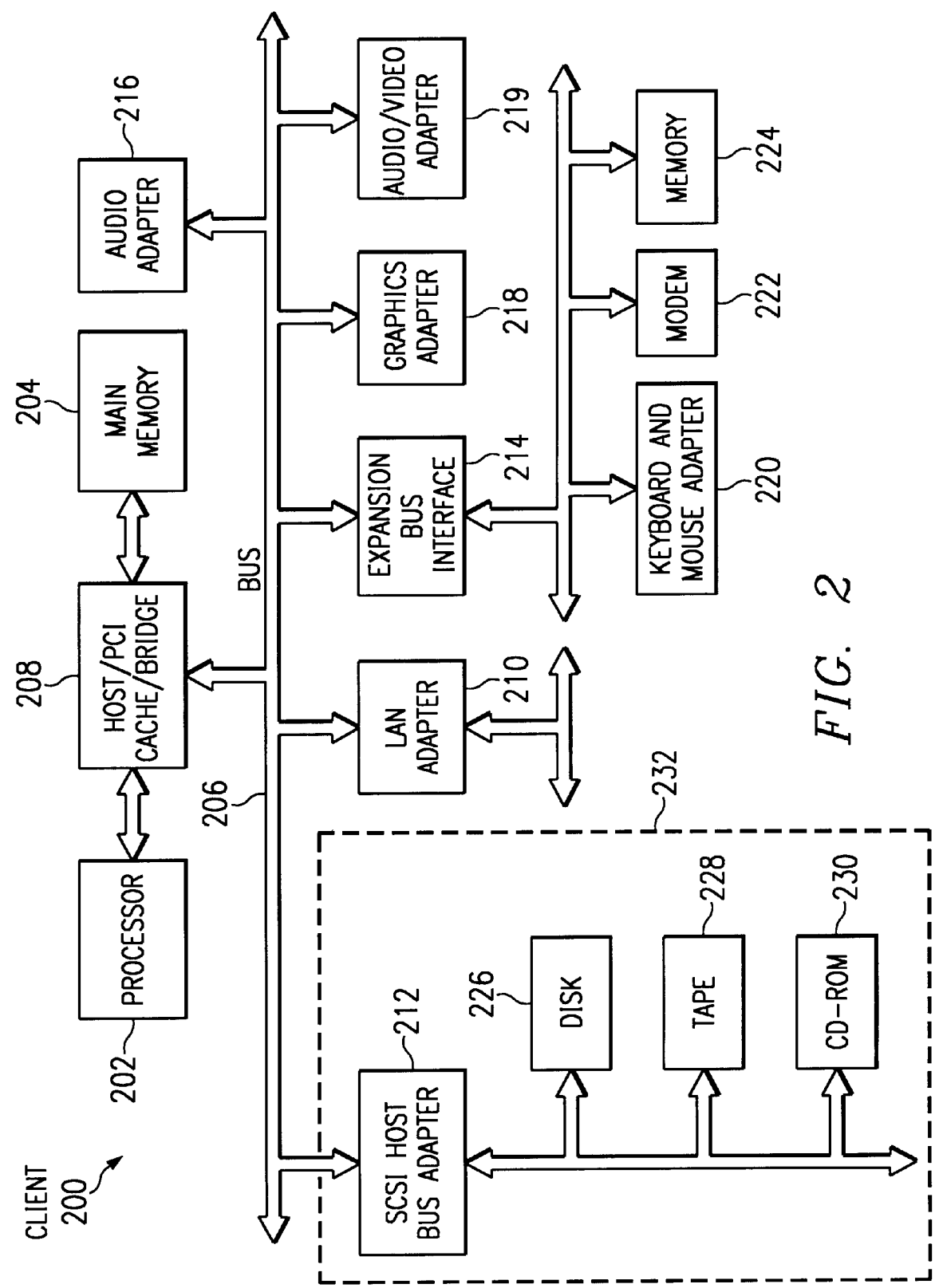
FIG. 2 is a block diagram illustrating a data processing system in which the present invention may be implemented in accordance with a preferred embodiment of the present invention.

With reference now to FIG. 2, a block diagram illustrating a data processing system in which the present invention may be implemented. Data processing system 200 is an example of a computer, such as computer 100 in FIG. 1, in which a JVM implementing the processes of the present invention may be located. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

The present invention provides a method, apparatus, and instructions for invoking Java methods from native code in which the creation of a temporary Java method and corresponding constant pool is avoided. Further, the mechanism of the present invention avoids unnecessary housekeeping in the JVM during method invocation and the need to mark and examine the javaframe for "return to native" as well as the "quickification" of the temporary Java method which must resolve entries in the corresponding constant pool. Further, the present invention also provides a more efficient means of copying parameters from a native stack to the javastack. For example, using a prior method, 860 instructions are used to invoke a particular Java method from native code while the process of the present invention accomplishes the same result in 50 instructions.

The present invention provides a mechanism for locating a method block for a method in a Java class. Previously, a temporary Java method and a corresponding constant pool which represented an "invoke" of the target Java method was employed. The resolution of the constant pool entry referenced by the temporary Java method caused the method block for the target method to be located. The present invention employs locating a method block for the target method directly by examining the referenced Java class. In many cases, the method block for the Java method is already known to the native code and can be directly used. In other cases, the method name and signature along with an object or a class reference are provided and the mechanism of the present invention uses a simple direct look up to find the method block.

Further, the mechanism of the present invention copies parameters from the native stack to the javastack for use by the target method. The parameters were placed on the native stack in a right-to-left order by native code. The native code, which is typically written in the ANSI C programming language, has this native calling convention. These parameters must be placed on the javastack in a left-to-right order as required by Java calling conventions. For 64-bit parameters, the Java types long and double, it is necessary to copy the two 32-bit words of the parameter in the correct order. 32-bit floating point parameters, the Java type float, also require special care when copying from the native stack to the javastack. ANSI C rules about passing 32-bit floating point parameters to a variable argument list function (the native function in the JVM which is called by native code to execute a Java method is a variable argument list function) require that 32-bit floating point parameters be promoted to 64-bit floating point values. Thus, this parameter exists on the native stack as a 64-bit floating point value and must be converted to a 32-bit floating point value before being copied onto the javastack. Previously, the Java method signature, an ASCII character string, was examined during method invocation for each parameter and then the parameter was copied based on the parameter type in the signature. In contrast, the present invention uses information collected at class load time to avoid costly signature examination during method invocation. At class load time, the mechanism of the present invention examines the method signature to determine if any parameters are passed to the method which require special treatment when being copied from the native stack to the javastack. If any of these parameters types are present, a 32-bit mask is created to indicate the positions of the parameters requiring special treatment. When the method is called from native code, the bit mask is then examined to control parameter copying.

Method invocation using the mechanism of the present invention involves passing control directly to the invoker identified in the method block rather than executing a temporary Java method. In the depicted examples, the native method stack is a C stack. Parameters in the native stack are in right-to-left order but the Java stack requires them to be left-to-right order thus they must be copied and the order of the parameters reversed. However, the types long, double and float create problems with simply copying the words in reverse order. A "long" is a 64-bit signed two's compliment integer (-263 to 263-1, inclusive). A "float" is a 32-bit IEEE 754 single-precision floating point number. A "double" is a 64-bit IEEE 754 double-precision floating point number.

The order of the two words making up a 64-bit parameter must be preserved. Because of ANSI C rules about passing float arguments to variable argument list function, the float argument is promoted to a double and then occupies two words on the native stack. However, this parameter must be converted back to float before placing it on the javastack. If these types are not used in the parameter list, then a "simple copy" can be used which simply copies the parameters a word at a time without regard to their type. If these types are present in the parameter list then the copy logic needs to know the type of each parameter in order to copy it correctly. If there are no more than 16 parameters in the list, then a "mask copy" under the control of a bitmask can be used. This bitmask denotes whether a parameter occupies 2 words on the native stack and additionaly if the parameter is a float. Each parameter is described by 2 bits in the 32-bit bitmask. Thus, the bitmask can describe at most 16 parameters. If these types are present in the parameter list and there are more than 16 parameters then there is not enough space in the bitmask to describe all of the parameters and the slow, prior art technique of examining the method signature in order to correctly copy the parameters must be used. This case is extremely rare.

In preparing for an eventual return to native code, presently available methods flag the Javaframe upon invocation to indicate that a return to native is required. This flag must be examined by the logic for all Java return bytecodes. In contrast, the present invention introduces a new bytecode, NativeReturn, that obviates the need for such checking. The use of this new bytecode reduces the number of instructions needed to return from a Java method to either native code or Java code. The returnPC field of the Javaframe is set to point to the NativeReturn bytecode prior to the method invocation. When the target method finally executes it's return bytecode, the "natural" course of return passes control to the NativeReturn bytecode which completes the return to the native caller.

Figure 3:
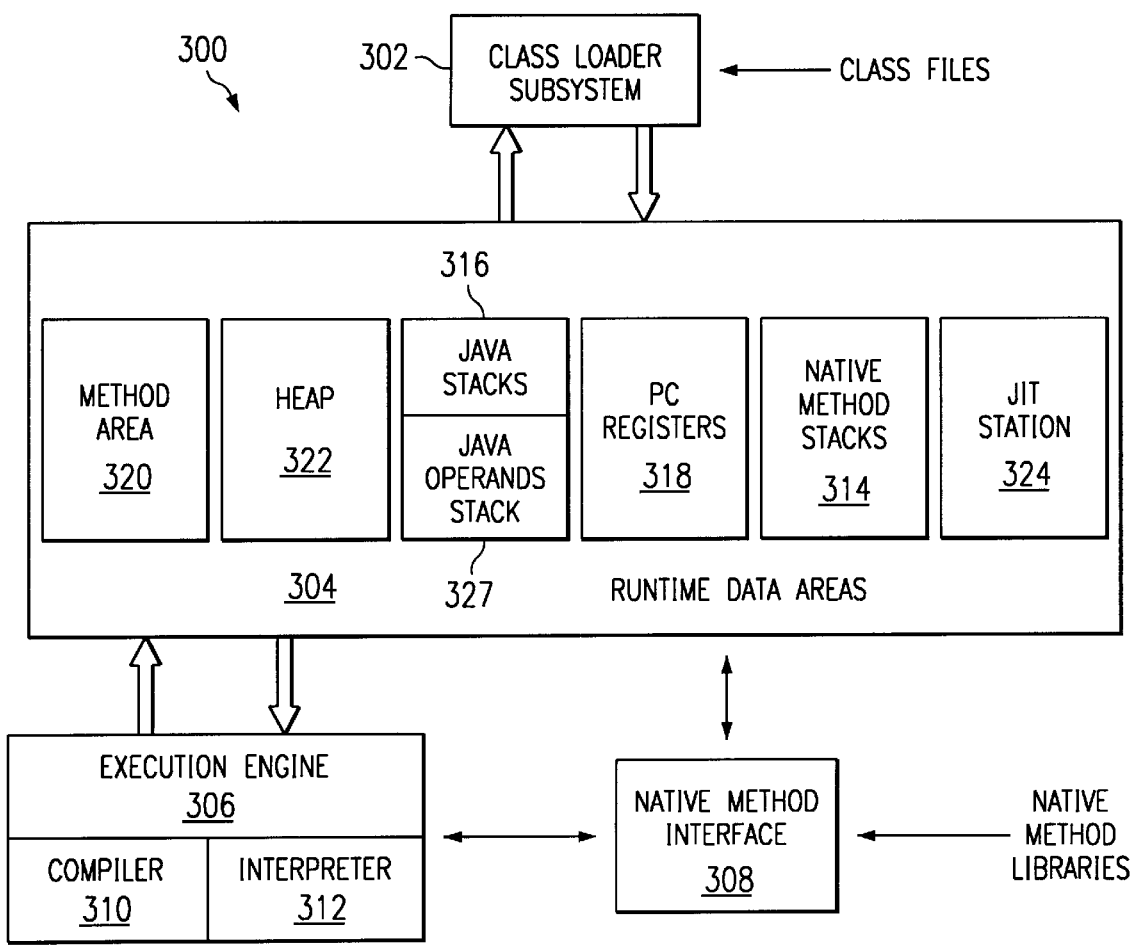
FIG. 3 is a block diagram of a Java virtual machine in accordance with a preferred embodiment of the present invention.

With reference now to FIG. 3, a block diagram of a Java virtual machine is depicted in accordance with a preferred embodiment of the present invention. Java virtual machine (JVM) 300 includes a class loader subsystem 302, which is a mechanism for loading types, such as classes and interfaces, given fully qualified names. JVM 300 also includes run time data areas 304, execution engine 306, and native method interface 308.

Execution engine 306 is a mechanism for executing instructions contained in any method of the classes loaded by class loader subsystem 302. In the depicted example, execution engine 306 includes a Just In Time compiler 310 and an interpreter 312. Bytecodes make up a method and are a sequence of instructions for JVM 300. Each instruction consists of a 1-byte opcode followed by zero or more fixed operands. The opcode indicates the operation to be performed. Variable operands and data appear on the Java operand stack 327, which appears within the Java stack 316. Interpreter 312 will cause the execution of the necessary code or instructions in response to this bytecode.

Compiler 310 is a Just In Time compiler in which the bytecodes of a method are normally compiled to native machine code the first time the method is invoked after it has been selected as a candidate for compilation. Selection may be based on a method's former CPU consumption, number of invokes, or some other criteria. It is also possible that all methods may be selected for compilation without regard to criteria. The native machine code for the method is then cached or stored in a buffer, so the code can be reused the next time the same method is invoked. In the depicted examples, the mechanism of the present invention allows for partial just in time compiling or JITing of the method.

Native method interface 308 is used as an interface to allow a Java program to interact with the host by invoking native methods. Native methods are typically stored in a dynamic link library. An example of a particular native method interface is a Java native interface (JNI). In essence, native method interface 308 allows access to resources in the underlying operating system.

Run time data areas 304 includes native method stacks 314, Java stacks 316, PC registers 318, method area 320, heap 322, and JIT station 324. These different data areas represent the organization of memory needed by JVM 300 to execute a program. Native method stacks 314 stores the state of invocations of native methods and other native code. Java stacks 316 is used to store the state of Java method invocations while PC registers 318 is used to indicate the next instruction to be executed. Both native method stacks 314 and Java stacks 316 are divided into frames to store information used during execution of Java methods and native code. Method area 320 contains class data while heap 322 contains all instantiated objects. JIT station 324 is used to store all information needed for compilation of the method such as flow control information, register assignments, and virtual operand stack content. The JIT station may be located as a single contiguous area of memory or may be multiple noncontiguous areas of memory and may be dynamically allocated or reusable.

Figures 4, 5:
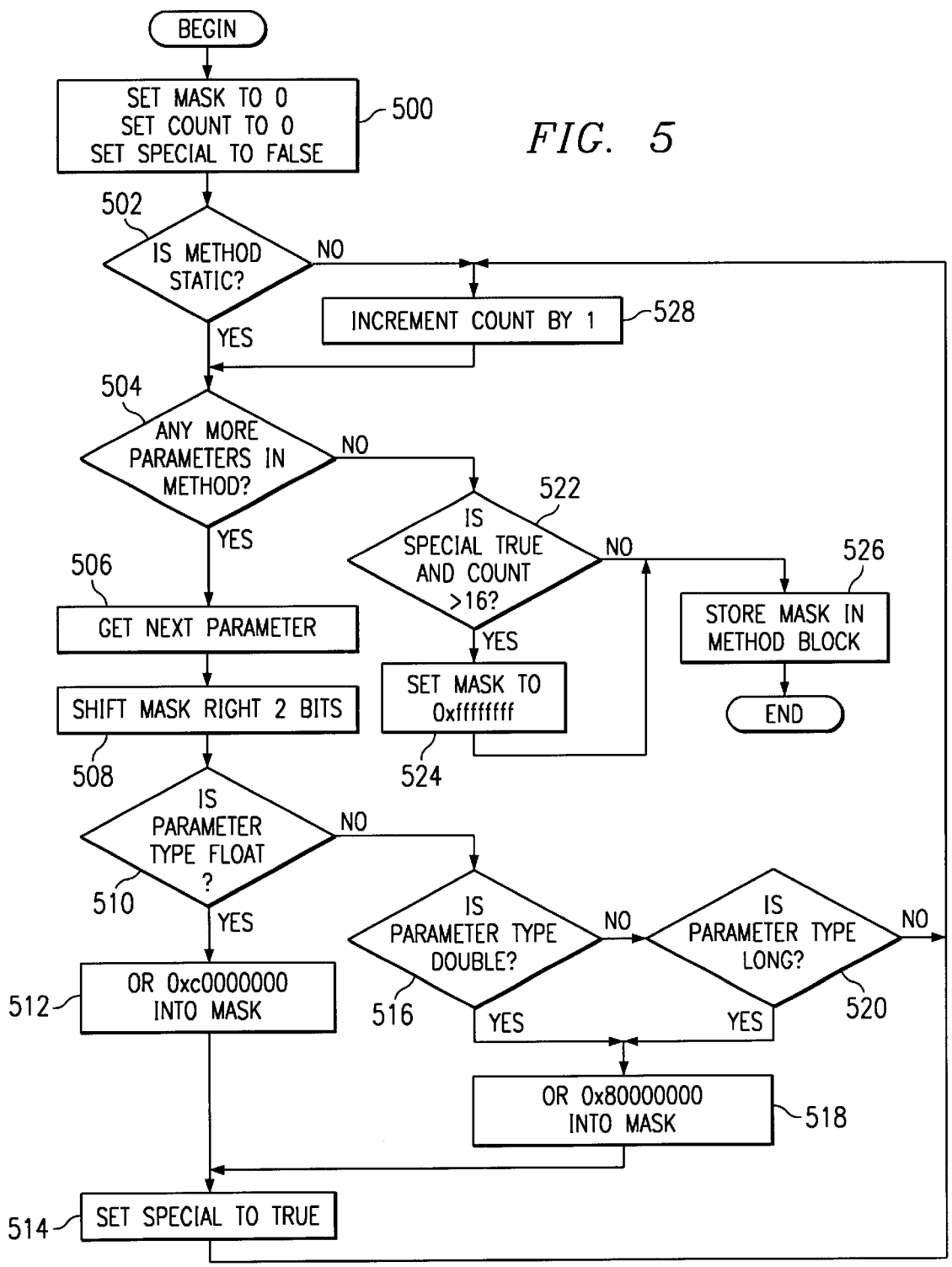
FIG. 4 is a block diagram of a method block depicted in accordance with a preferred embodiment of the present invention.
FIG. 5 is a flowchart of a process for creating a bit mask for Java function parameters depicted in accordance with a preferred embodiment of the present invention.

With reference now to FIG. 4, a block diagram of a method block is depicted in accordance with a preferred embodiment of the present invention. Method block 400 contains information about a method. For example, pointer to the class object, the signature of the method, and a pointer to bytecodes are contained within method block 400. In the depicted example, mask 402 also is included within method block 400. In particular, mask 402 is a bit mask that is used to determine how parameters should be copied from a frame in a native method stack to a frame in a Java stack. Method block 400 may be found in method area 320 in FIG. 3.

With reference now to FIG. 5, a flowchart of a process for creating a bit mask for Java function parameters is depicted in accordance with a preferred embodiment of the present invention. The process begins by setting the variable mask equal to zero, setting the variable count equal to zero, and setting the variable special to false (step 500). Thereafter, a determination is then made as to whether the method is a static method(step 502). If the method is not a static method, the "hidden" object reference passed as the first parameter to non-static methods must be counted and the process proceeds to step 528, incrementing the variable count by one, with the process then proceeding to step 504. On the other hand, if the method is a static method, a determination is then made as to whether additional parameters to be examined are present (step 504). If additional parameters to be examined are present, the next parameter is then obtained (step 506). Next, the mask is shifted to the right by 2-bits (step 508). The mask in this example is divided into pairs of bits. In these examples, the first bit in the pair is used to identify whether the parameter is one that requires special processing while the second bit in the pair is used to identify or indicate the type of processing or the type of parameter. The mask is shifted by 2-bits to reach the next pair of bits used to identify a parameter. Thereafter, a determination is then made as to whether the parameter is of type float (step 510). If the parameter is of type float, the value 0xc0000000 is bitwise ORed into the mask (step 512). The variable special is then set equal to true (step 514), to indicate that a parameter requiring special treatment has been found, with the process then returning to step 528 to increment the variable count by one.

With reference again to step 510, if the parameter is not of type float, then a determination is then made as to whether the parameter is of type double (step 516). If the parameter is of type double then the value 0x80000000 is bitwise ORed into the mask (step 518) with the process then proceeding to step 514 as described above.

With reference again to step 516 if the parameter is not of type double, a determination is then made as to whether the parameter is of type long (step 520). If the parameter is of type long, the process proceeds to step 518 as described above. Otherwise, the process returns to step 528.

With reference again to step 504 if all parameters to the method have been examined, then a determination is then made as to whether the variable special is set to true and whether the variable count is greater than 16 (step 522). If the variable special is true and the variable count is greater than 16, then the method has parameters requiring special treatment and there is not enough space in the mask to describe all the parameters. The mask is set to 0xffffffff (step 524) to indicate this condition. The mask is then stored in the method block (step 526) with the process terminating thereafter. The mask is also stored in the method block in step 526 if the variable special in step 522 is not true or the variable count is less than 17.

Figure 6A:
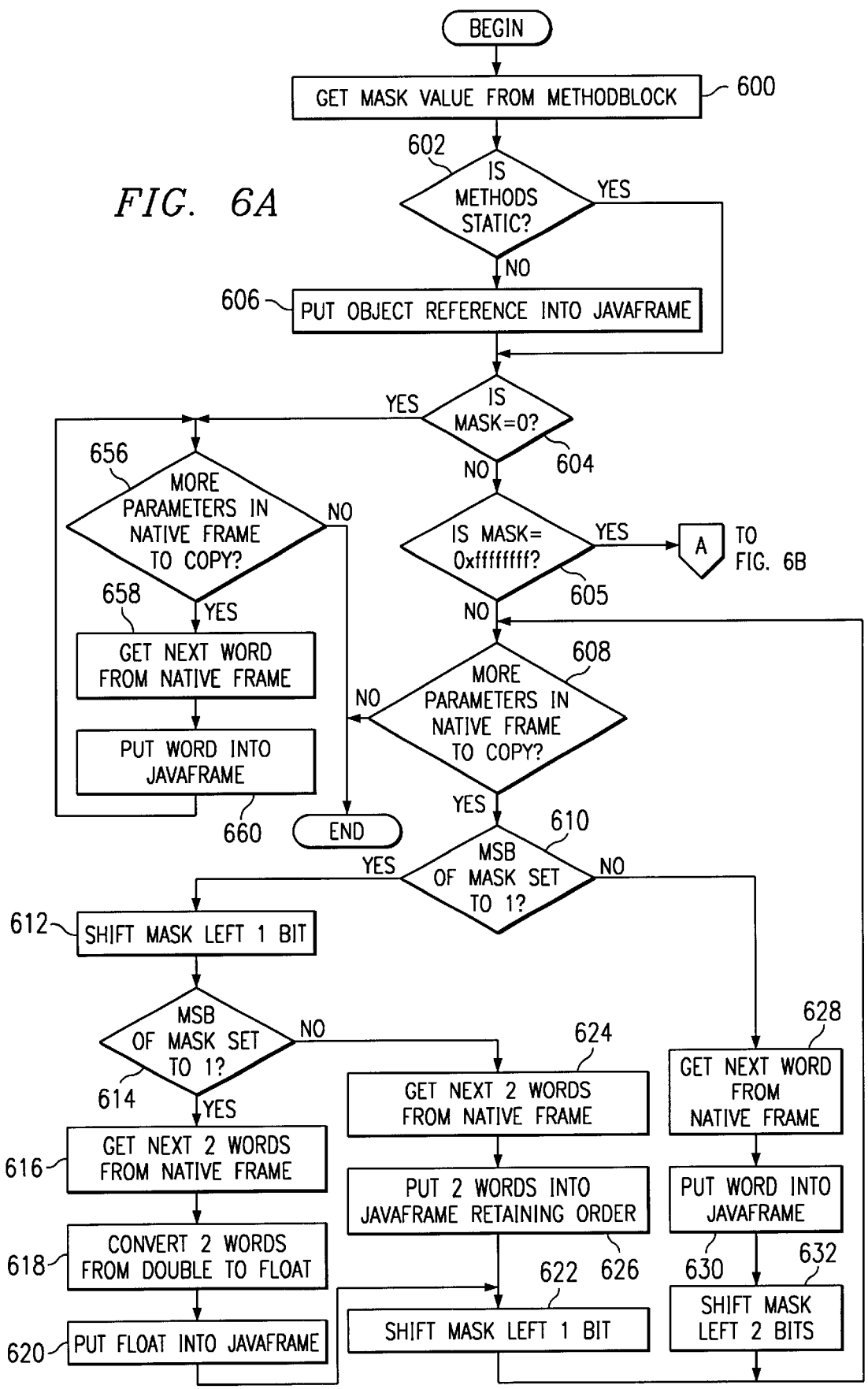
Figure 6B:
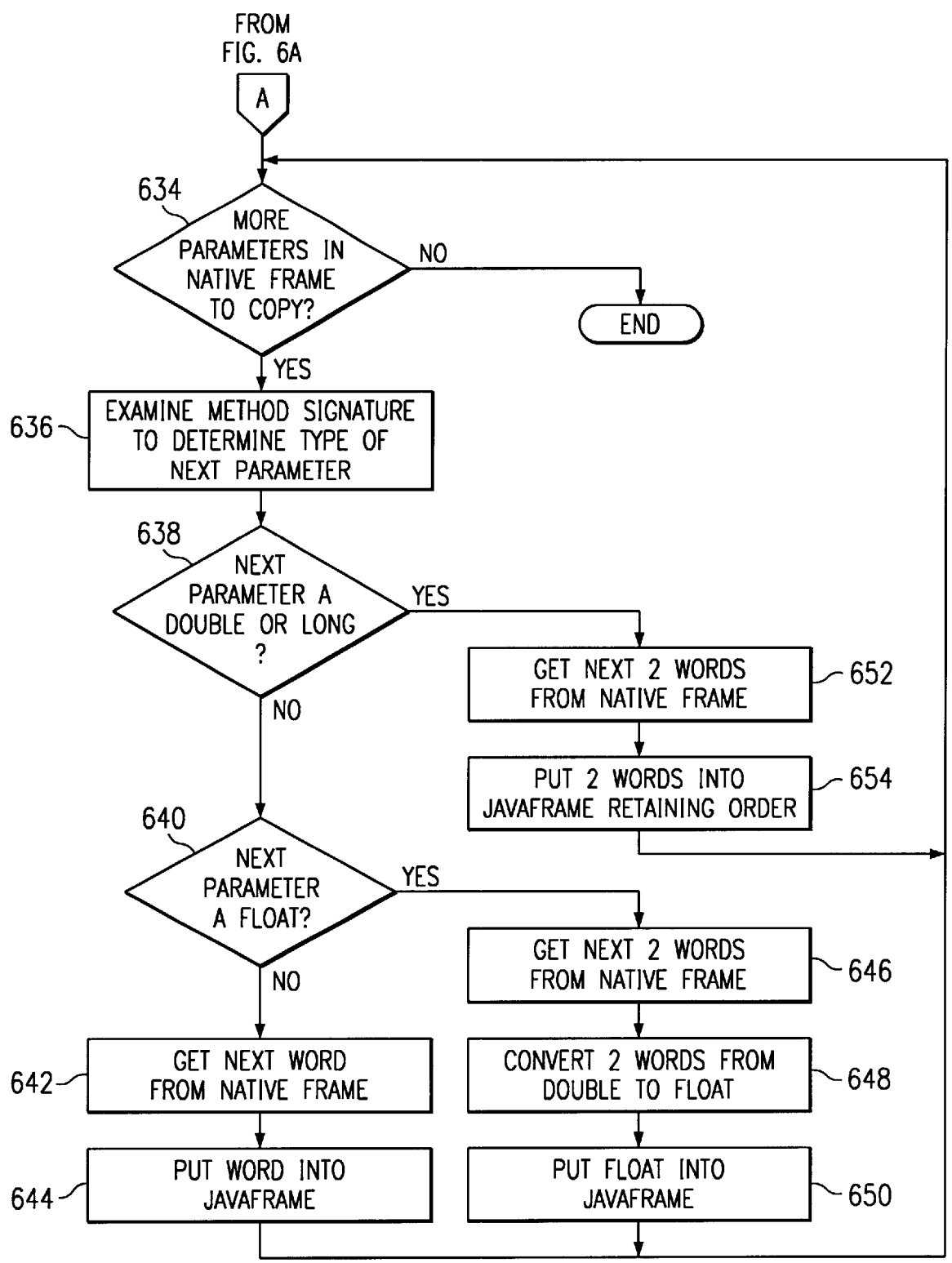

With reference now to FIGS. 6A–6C, flowcharts of a process for copying parameters from the native frame to the Javaframe are depicted in accordance with a preferred embodiment of the present invention. In FIG. 6A, the process begins by obtaining the mask value from the method block (step 600). Thereafter, a determination is then made as to whether the method is a static method (step 602). If the method is not a static method, then the method applies to a specific object and an object reference to that object is placed into the Javaframe as the "hidden" first parameter (step 606) with the process proceeding to step 604. If the method is a static method, a determination is then made as to whether the mask is set equal to zero (step 604). If the mask is not equal to zero, a determination is then made as to whether the mask is equal to 0xffffffff (step 605). A mask value of 0xffffffff may be set by step 524 in FIG. 5 to indicate that the mask is unable to describe the parameters. If the mask is not equal to 0xffffffff, then a "mask copy" is performed and the process proceeds to FIG. 6B. In this situation, the parameters for the method include 64-bit or float parameters and there are less than 17 parameters. In this instance, a determination is then made as to whether more parameters a present in the native frame to copy (step 608).

If there are no more parameters to copy, the process terminates. Otherwise, a determination is then made as to whether the most significant bit "MSB" of the mask is set equal to one (step 610). If the MSB of the mask is set equal to one, then the mask is shifted left by 1-bit (step 612). The mask is shifted left one bit in step 612 to move to the second bit in the bit pair, which is used to identify the type of parameter or type of action to be taken to process the parameter. A determination is then made as to whether the MSB of the mask is set equal to one (step 614). If the MSB of the mask is set equal to one, then the next two words are obtained from the native frame (step 616). These two words are converted from double to float (step 618). The float is then placed into the Javaframe (step 620). Thereafter, the mask is shifted left 1 bit (step 622) with the process then returning to step 608 as described above.

With reference again to step 614, if the MSB of the mask is not set equal to one, then the next two words are obtained from the native frame (step 624) and these two words are put into the Javaframe retaining the order in which they were found (step 626). Thereafter, the process proceeds to step 622 as described above.

With reference again to step 610, if the MSB of the mask is not set equal to one, then the next word is obtained from the native frame (step 628). Thereafter, the word is put into the Javaframe (step 630). The mask is then shifted left by 2 bits (step 632) with the process then returning to step 608 as described above. The mask is shifted left 2 bits to move to the next bit pair associated with the next parameter.

With reference again to step 605 in FIG. 6A, if the mask is set equal to 0xffffff, then a "signature copy" is performed and the process proceeds to FIG. 6C. In this situation, the parameters for the method include 64-bit or float parameters and there are more than 16 parameters. A determination is then made as to whether more parameters are present in the native frame to copy (step 634). If there are no more parameters to copy, the process terminates. Otherwise, the method signature is examined to determine the type of the next parameter (step 636). Thereafter, a determination is then made as to whether the next perameter is of type double or of type long (step 638). If the next parameter is not a double or a long, then a determination is then made as to whether the next parameter is of type float (step 640). If the next parameter is not a float, then the next word is obtained from the native frame (step 642). This word is put into the Javafame (step 644) with the process then returning to step 634 as described above.

With reference again to step 640, if the next parameter is a float, the next two words are obtained from the native frame (step 646). Thereafter, the two words are converted from double to float (step 648). The float is then placed into the javaframe (step 650) with the process then returning to step 634.

With reference again to step 638, if the next parameter is a double or a long, then the next two words are obtained from the native frame (step 652). These two words are put into the Javaframe retaining their original order (step 654) with the process then returning to step 634 as described above.

With reference again to step 604 in FIG. 6A, if the mask is set equal to zero, then a "simple copy" will occur since no 64-bit or float parameters are present. A determination is then made as to whether more parameters are present in the native frame to copy (step 656). If there are no more parameters to copy, the process terminates. Otherwise, the next word is obtained from the native frame (step 658). This word is placed into the Javaframe (step 660) with the process then returning to step 656 as described above.

Figure 7:
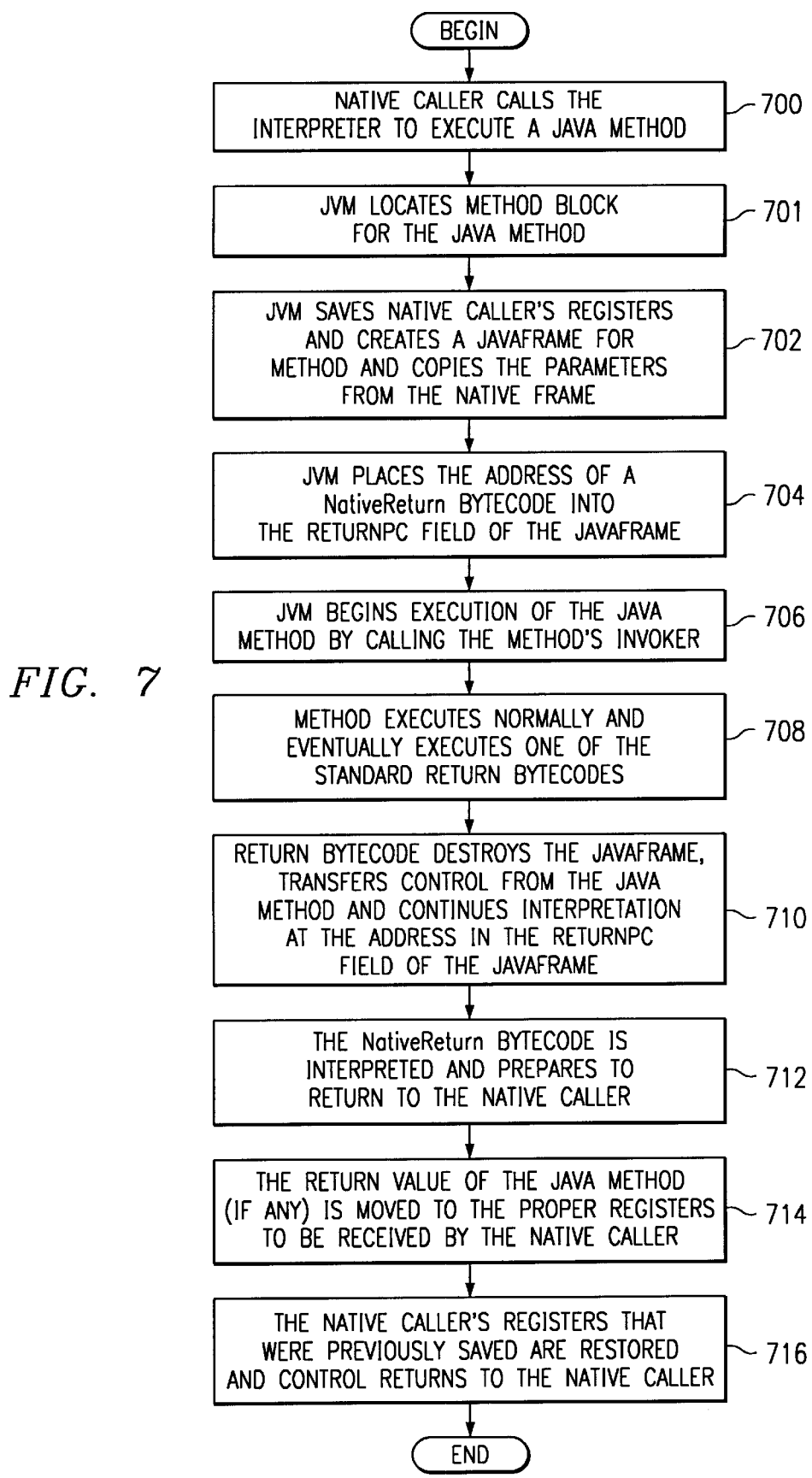
FIG. 7 is a flowchart of a process used by a native return bytecode depicted in accordance with a preferred embodiment of the present invention.

With reference now to FIG. 7, a flowchart of a process used by a native return bytecode is depicted in accordance with a preferred embodiment of the present invention. This process is executed when native code calls a Java method. The process begins with a native caller calling the JVM to execute a Java method (step 700). The native caller in these examples is the native code or instructions that generate a call for a Java method. The JVM then locates the method block for the target Java method (step 701). The JVM then saves the native callers register's and creates a Javaframe for the method and copies the parameters from the native frame (step 702). In the depicted examples, the native frame is a C frame. Thereafter, the JVM places the address of the NativeReturn bytecode into the returnPC field of the Javaframe (step 704). The JVM then begins execution of the Java method by calling the method's invoker (step 706). Thereafter, the method executes normally, and eventually returning to it's caller by executing a standard return bytecode (step 708). In response to executing a standard return bytecode, the JVM destroys the Javaframe, transfers control from the Java method and continues interpretation at the address in the returnPC field of the Javaframe (step 710). The NativeReturn bytecode is interpreted and control is transferred back to the original native caller along with the return value of the target Java method (step 712). Specifically, the return value of the Java method, if any, is moved to the proper registers to be received by the native caller (step 714). Thereafter, the native caller's registers that were previously saved are restored and control returns to the native caller (step 716) with the process terminating thereafter.

Figure 8:
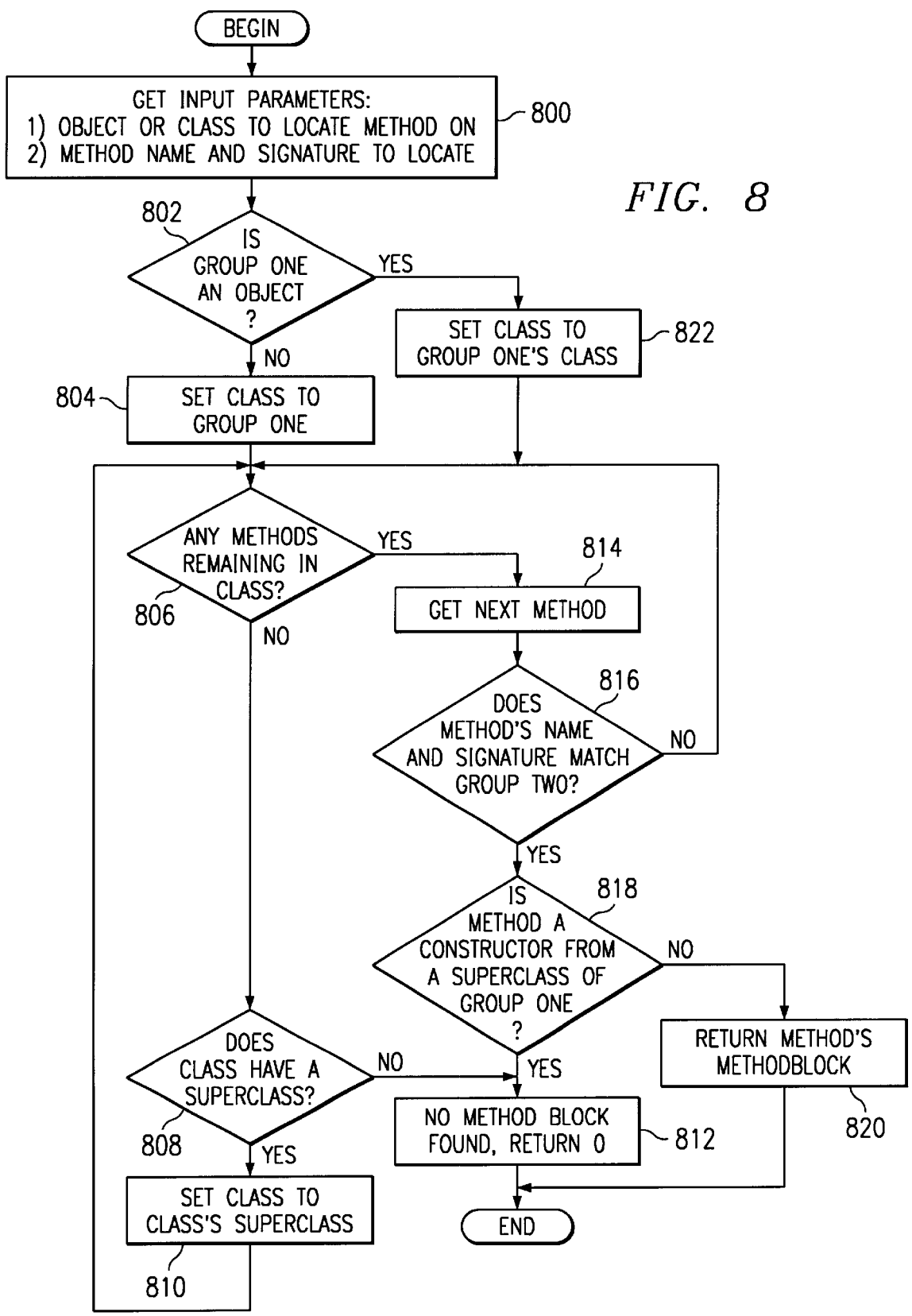
FIG. 8 is a flowchart of a process for locating method blocks depicted in accordance with a preferred embodiment of the present invention.

With reference now to FIG. 8, a flowchart of a process for locating method blocks is depicted in accordance with a preferred embodiment of the present invention. The process begins with input parameters passed to it by it's caller (step 800). These input parameters include two groups. Group one is an object or class on which to locate the method, while group two contains the method name and signature to locate.

A determination is then made as to whether the group one parameter is an object (step 802). If group one is an object, the variable class is set equal to the class of the object (step 822) with the process proceeding to step 806 as described below.

With reference again to step 802, if group one is not an object, then it is a class and the variable class is set equal to group one (step 804). Then, a determination is then made as to whether there are any more methods remaining to be examined in the class referenced by the variable class (step 806). If no methods remain to be examined in the class, a determination is then made as to whether the class has a superclass (step 808). If the class has a superclass, then the variable class is set equal to the superclass (step 810) with the process then returning to step 806. Otherwise, the process then returns a zero because no method block has been found (step 812) with the process terminating thereafter.

With reference again to step 806, if additional methods remain to be examined in the class referenced by the variable class, the next method in the class is obtained (step 814) A determination is then made as to whether the method name and the signature of the obtained method match group two (step 816). If a match is absent, the process returns to step 806 as described above. Otherwise, a determination is then made as to whether the method is a constructor from a superclass of group one (step 818). It is not legal in the Java language to inherit a constructor from a superclass. If the method is not a constructor from a superclass of group one, the method block for the method is returned (step 820) with the process terminating thereafter. Otherwise, the process proceeds to step 812 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer in which the virtual machine is located. In particular, the present invention may be used with other interpretable methods other than java methods. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process for invoking an interpretable method from a method written in native code comprising:

collecting parameter information for the interpretable method at class load time of the method for use when called by the method written in native code; and copying parameters, using the collected parameter information, to a frame used by an interpreter to interpret the interpretable method when the interpretable method is invoked by the method written in native code to create an interpreted method.

2. The process of claim 1 further comprising:

using a method block, known to the native code, to invoke the interpretable method in the interpreter; and invoking the interpreted method using an invoker identified in the method block.

3. The process of claim 1 further comprising:

creating a bytecode to indicate a return to native code.

4. The method of claim 1, wherein the parameters are copied from a native stack to a Java stack in which the frame is located.

5. The method of claim 1, wherein the parameter information describes the parameters as ones requiring processing in addition to being copied to the frame.

6. A process in a data processing system for executing a interpretable method from a native method, the process comprising the data processing system implemented steps of:

examining a method prior to a first execution of the interpretable method to identify a presence of a selected parameter from a set of parameters for the interpretable method;

creating a bitmask to describe the selected parameter; and copying the set of parameters to a frame using the bitmask.

7. The process of claim 6 wherein the interpretable method is a Java method.

8. The process of claim 6 wherein the parameters are copied from a C frame to the Java frame.

9. The process of claim 6, wherein the mask is a 32-bit mask.

10. The process of claim 6, wherein the selected parameters are 64-bit parameters and 32-bit floating point parameters.

11. The process of claim 10, wherein a bit value of a logic one in the first bit indicated a presence of the selected parameter.

12. The process of claim 6, wherein the examining step is performed at class load time.

13. A process in a data processing system for executing a interpretable method from a native method, the process comprising the data processing system implemented steps of:

examining a method prior to a first execution of the method to identify a presence of a selected parameter from a set of parameters for the method;

creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed; and copying the set of parameters to a frame using the bitmask.

14. A process in a data processing system for invoking a plurality of instructions non-specific to the data processing system from a native method specific to the data processing system, the process comprising the data processing system implemented steps of:

examining the plurality of instructions nonspecific to the data processing system prior to a first execution of the instructions to identify a presence of a selected parameter from a set of parameters for the plurality of instructions;

creating a bitmask to describe the selected parameter; and coping the set of parameters using the bitmask.

15. The process of claim 14, wherein the plurality of instructions non-specific to the data processing system are java bytecodes.

16. The process of claim 14, wherein the java bytecodes form a method.

17. The process of claim 16 further comprising:

locating a method block for the java method using an identification of the java method.

18. The process of claim 17, wherein the identification includes a method name, a signature, and an object reference or class reference.

19. The process of claim 14, wherein the selected parameter is a float.

20. The process of claim 14, wherein the selected parameter is a double.

21. The process of claim 14, wherein the selected parameter is a long.

22. A process in a data processing system for invoking a plurality of instructions non-specific to the data processing system from a native method specific to the data processing system, the process comprising the data processing system implemented steps of:

examining the plurality of instructions nonspecific to the data processing system prior to a first execution of the instructions to identify a presence of a selected parameter from a set of parameters for the plurality of instructions;

creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed; and copying the set of parameters using the bitmask.

23. A process in a data processing system for invoking a plurality of instructions non-specific to the data processing system from a native method specific to the data processing system, the process comprising the data processing system implemented steps of:

examining the plurality of instructions nonspecific to the data processing system prior to a first execution of the instructions to identify a presence of a selected parameter from a set of parameters for the plurality of instructions;

creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed and wherein a bit value of a logic one in the first bit indicated a presence of the selected parameter; and copying the set of parameters using the bitmask.

24. A process in a data processing system for returning from code nonspecific to the data processing system to native code, the process comprising the data processing system implemented steps of:

receiving a call from a native caller to execute a interpretable method;

responsive to receiving the call, creating a pointer to a selected return bytecode; and responsive to encountering a return in the java method, executing the selected return bytecode, wherein the selected return bytecode moves any return value present as a result of execution of the interpretable method into a location for use by the native caller and returns control to the native caller.

25. The data processing system of claim 24, wherein the interpretable method is a java method.

26. The process of claim 24, wherein the selected return bytecode restores registers for the native caller.

27. The data processing system of claim 26, wherein the interpretable method is a java method.

28. A data processing system for invoking an interpretable method from a method written in native code comprising:

collecting means for collecting parameters for the interpretable method at class load time of the method written in native code; and using means for using the collected parameters to load a frame used by an interpreter to interpret the interpretable method when the interpretable method is invoked by the method written in native code to create an interpreted method.

29. The data processing system of claim 28 further comprising:

using means for using a known method block to invoke the interpretable method in the interpreter; and invoking means for invoking the interpreted method using an invoker identified in the known method block.

30. The data processing system of claim 28 further comprising:

creating means for creating a bytecode to indicate a return to the method written in native code.

31. A data processing system for executing a interpretable method from a native method, the data processing system comprising:

examining means for examining a method prior to first execution of the interpretable method to identify a presence of a selected parameter from a set of parameters for the interpretable method;

creating means for creating a bitmask to describe the selected parameter; and copying means for copying the set of parameters to a frame using the bitmask.

32. The data processing system of claim 31, wherein the parameters are copied from a C frame to the Java frame.

33. The data processing system of claim 31, wherein the mask is a 32-bit mask.

34. The data processing system of claim 31, wherein the selected parameters are 64-bit parameters or 32-bit floating point parameters.

35. The data processing system of claim 31, wherein the examining means is executed at class load time.

36. A data processing system for executing a interpretable method from a native method, the data processing system comprising:

examining means for examining a method prior to first execution of the method to identify a presence of a selected parameter from a set of parameters for the method;

creating means for creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed; and copying means for copying the set of parameters to a frame using the bitmask.

37. A data processing system for executing a interpretable method from a native method, the data processing system comprising:

examining means for examining a method prior to first execution of the method to identify a presence of a selected parameter from a set of parameters for the method;

creating means for creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed and wherein a bit value of a logic one in the first bit indicated a presence of the selected parameter; and copying means for copying the set of parameters to a frame using the bitmask.

38. A data processing system for invoking a plurality of instructions non-specific to the data processing system from a native method specific to the data processing system, the data processing system comprising:

examining means for examining the plurality of instructions nonspecific to the data processing system prior to a first execution of the instructions to identify a presence of a selected parameter from a set of parameters for the plurality of instructions;

creating means for creating a bitmask to describe the selected parameter; and copying means for copying the set of parameters using the bitmask.

39. The data processing system of claim 38, wherein the plurality of instructions non-specific to the data processing system are java bytecodes.

40. The data processing system of claim 38, wherein the java bytecodes form a method.

41. The data processing system of claim 40 further comprising:

locating means for locating a method block for the java method using an identification of the java method.

42. The data processing system of claim 41, wherein the identification includes a method name, a signature, and an object reference or class reference.

43. The data processing system of claim 38, wherein the selected parameter is a float.

44. The data processing system of claim 38, wherein the selected parameter is a double.

45. The data processing system of claim 38, wherein the selected parameter is a long.

46. A data processing system for invoking a plurality of instructions non-specific to the data processing system from a native method specific to the data processing system, the data processing system comprising:

examining means for examining the plurality of instructions nonspecific to the data processing system prior to a first execution of the instructions to identify a presence of a selected parameter from a set of parameters for the plurality of instructions;

creating means for creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed; and copying means for copying the set of parameters using the bitmask.

47. A data processing system for invoking a plurality of instructions non-specific to the data processing system from a native method specific to the data processing system, the data processing system comprising:

examining means for examining the plurality of instructions nonspecific to the data processing system prior to a first execution of the instructions to identify a presence of a selected parameter from a set of parameters for the plurality of instructions;

creating means for creating a bitmask to describe the selected parameter, wherein the bitmask contains bits and wherein the plurality of bits are grouped into pairs in which a first bit in a pair indicates whether a parameter associated with the pair is the selected parameter and a second in the pair indicates how the selected parameter is to be processed and wherein a bit value of a logic one in the first bit indicated a presence of the selected parameter; and copying means for copying the set of parameters using the bitmask.

48. A data processing system for returning from code nonspecific to the data processing system to native code, the data processing system comprising:

receiving means for receiving a call from a native caller to execute a interpretable method;

creating means, responsive to receiving the call, for creating a pointer to a selected return bytecode; and executing means, responsive to encountering a return in the interpretable method, for executing the selected return bytecode, wherein the selected return bytecode moves any return value present as a result of execution of the interpretable method into a location for use by the native caller and returns control to the native caller.

49. The data processing system of claim 48, wherein the interpretable method is a java method.

50. The data processing system of claim 48, wherein the selected return bytecode restores registers for the native caller.

51. A computer program product in a computer readable medium for invoking an interpretable method from a method written in native code comprising:

first instructions for collecting parameters for the interpretable method at class load time of the method written in native code; and second instructions for using the collected parameters to load a frame used by an interpreter to interpret the interpretable method when the interpretable method is invoked by the method written in native code to create an interpreted method.

52. A computer program product in a computer readable medium for executing a interpretable method from a native method, the computer program product comprising:

first instructions for examining a method prior to a first execution of the interpretable method to identify a presence of a selected parameter from a set of parameters for the interpretable method;

second instructions for creating a bitmask to describe the selected parameter; and third instructions for copying the set of parameters to a frame using the bitmask.

53. A computer program product in a computer readable medium for invoking a plurality of instructions non-specific to the data processing system from a native method specific to the data processing system, the computer program product comprising:

first instructions for examining the plurality of instructions nonspecific to the data processing system prior to a first execution of the instructions to identify a presence of a selected parameter from a set of parameters for the plurality of instructions;

second instructions for creating a bitmask to describe the selected parameter; and third instructions for copying the set of parameters using the bitmask.

54. A computer program product in a computer readable medium for returning from code nonspecific to a data processing system to native code, the computer program product comprising:

first instructions for receiving a call from a native caller to execute a interpretable method;

second instructions, responsive to receiving the call, for creating a pointer to a selected return bytecode; and third instructions, responsive to encountering a return in the interpretable method, for executing the selected return bytecode, wherein the selected return bytecode moves any return value present as a result of execution of the interpretable method into a location for use by the native caller and returns control to the native caller.

55. A data processing system for invoking an interpretable method from a method written in native code, the data processing system comprising:

a bus system;

a communications unit connected to the bus system;

a memory connected to the bus system, wherein the memory includes a set of instructions; and a processing unit connected to the bus system, wherein the processing unit executes the set of instructions to collect parameter information for the interpretable method at class load time of the method for use when called by the method written in native code; and copy parameters, using the collected parameter information, to a frame used by an interpreter to interpret the interpretable method when the interpretable method is invoked by the method written in native code to create an interpreted method.

56. A data processing system for executing a interpretable method from a native method, the data processing system comprising:

a bus system;

a communications unit connected to the bus system;

a memory connected to the bus system, wherein the memory includes a set of instructions; and a processing unit connected to the bus system, wherein the processing unit executes the set of instructions to examine a method prior to a first execution of the interpretable method to identify a presence of a selected parameter from a set of parameters for the interpretable method; create a bitmask to describe the selected parameter; and copy the set of parameters to a frame using the bitmask.

57. A data processing system for invoking a plurality of instructions nonspecific to the data processing system from a native method specific to the data processing system, the data processing system comprising:

a bus system;

a communications unit connected to the bus system;

a memory connected to the bus system, wherein the memory includes a set of instructions; and a processing unit connected to the bus system, wherein the processing unit executes the set of instructions to examine the plurality of instructions nonspecific to the data processing system prior to a first execution of the instructions to identify a presence of a selected parameter from a set of parameters for the plurality of instructions; create a bitmask to describe the selected parameter; and copy the set of parameters using the bitmask.

58. A data processing system for returning from code nonspecific to the data processing system to native code, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive a call from a native caller to execute a interpretable method; create a pointer to a selected return bytecode in response to receiving the call; and execute the selected return .bytecode in which the selected return bytecode moves any return value present as a result of execution of the interpretable method into a location for use by the native caller and returns control to the native caller in response to encountering a return in the interpretable method.

* * * * *